United States Patent [19]

Bailey et al.

[11] Patent Number: 4,970,267

[45] Date of Patent: Nov. 13, 1990

[54] RECONSTITUTION OF SUPERABSORBENT POLYMER FINES USING PERSULFATE SALTS

[75] Inventors: Kristy M. Bailey; Glenn W. Flasch, both of Naperville, Ill.

[73] Assignee: Nalco Chemical Company, Naperville, Ill.

[21] Appl. No.: 491,402

[22] Filed: Mar. 8, 1990

[51] Int. Cl.$^5$ ................................................. C08F 8/34
[52] U.S. Cl. .................................. 525/344; 525/54.24; 525/54.26; 525/329.8; 521/40.5; 528/487; 526/930
[58] Field of Search .................. 521/40.5; 525/329.8, 525/344, 52.24, 52.26; 528/487, 502; 526/930

[56] References Cited

U.S. PATENT DOCUMENTS

| | | | |
|---|---|---|---|
| 3,514,510 | 5/1970 | Hoffman, Jr. | 264/117 |
| 3,935,363 | 1/1976 | Burkholder et al. | 428/281 |
| 4,064,071 | 12/1977 | Gilmour et al. | 252/455 R |
| 4,123,397 | 10/1978 | Jones | 260/17.4 GC |
| 4,286,082 | 8/1981 | Tsubakimoto et al. | 526/240 |
| 4,342,858 | 8/1982 | Herman et al. | 526/930 X |
| 4,354,487 | 10/1982 | Oczkowski et al. | 128/156 |
| 4,410,571 | 10/1983 | Korpman | 427/385.5 |
| 4,446,261 | 5/1984 | Yamasaki et al. | 524/40 |
| 4,654,039 | 3/1987 | Brandt et al. | 604/368 |
| 4,698,404 | 10/1987 | Cramm et al. | 526/204 |
| 4,703,067 | 10/1987 | Mikita et al. | 521/63 |

FOREIGN PATENT DOCUMENTS

| | | |
|---|---|---|
| 1109051 | 9/1981 | Canada . |
| 68684 | 1/1983 | European Pat. Off. . |
| 94842 | 11/1983 | European Pat. Off. . |
| 138427 | 4/1985 | European Pat. Off. . |
| 0248437 | 12/1987 | European Pat. Off. . |
| 2051708 | 4/1971 | Fed. Rep. of Germany . |
| 2844956 | 4/1979 | Fed. Rep. of Germany . |
| 2173934 | 11/1973 | France . |
| 56-2846 | 1/1981 | Japan . |
| 428211 | 6/1983 | Sweden . |
| 1376091 | 12/1975 | United Kingdom . |
| 2021116 | 11/1979 | United Kingdom . |
| 2083487 | 3/1982 | United Kingdom . |

OTHER PUBLICATIONS

Application Ser. No. 07/286,115, Lewis et al., filed Dec. 16, 1988.
Aleman, Jose, "Drying Granulated Polymers", Rev. Plast. Mod., 30(232), pp. 509–17(Spain) 1975.

*Primary Examiner*—Fred Teskin
*Attorney, Agent, or Firm*—Ailes, Ohlandt & Greeley

[57] ABSTRACT

A method for reconstituting superabsorbent polymer fines which comprises the following steps: wetting the superabsorbent polymer fines with an aqueous solution sufficient to form an amorphous gel of the fines, grinding the gel, and drying the ground gel product; wherein the improvement is characterized by the addition of an aqueous solution containing a persulfate salt.

19 Claims, No Drawings

RECONSTITUTION OF SUPERABSORBENT POLYMER FINES USING PERSULFATE SALTS

BACKGROUND OF THE INVENTION

The present invention provides a novel method for recovering and reprocessing superabsorbent polymer fines. The method provides for the reconstitution of the fines back to superabsorbent polymers useful in applications, such as, diapers, sanitary napkins, soil additives, fuel filters, desiccants, cements, and sludge dewatering. The reconstitution method is similar to that set forth in co-pending U.S. patent application, Ser. No. 286,115, filed on Dec. 16, 1988, now U.S. Pat. No. 4,950,692, entitled "Method for Reconstituting Superabsorbent Polymer Fines". However, the novel process of the present invention provides for the simultaneous chemical modification of the superabsorbent polymer fines during the reconstitution process, thereby increasing the crosslinking in the superabsorbent polymer and, consequently, improving the gel strength in the resultant reconstituted superabsorbent polymer material.

Hydrogel-forming polymer compositions (hereinafter referred to as superabsorbent polymers) are used as absorbents in absorbent structures and absorbent articles. Synthetic superabsorbent polymers are typically produced by one of the following methods: gel, inverse suspension, or modified bulk polymerization. Typical gel methods for producing superabsorbent polymers are described in U.S. Pat. No. 4,654,039 (Brandt et al.) issued Mar. 31, 1987, and U.S. Pat. No. 4,286,082 (Tsubakimoto et al.) issued Aug. 25, 1981. Typical inverse suspension processes for producing superabsorbent polymers are disclosed in U.S. Pat. No. 4,698,404 (Cramm et al.) issued Oct. 6, 1987, U.S. Pat. No. 4,446,261 (Yamasaki et al.) issued May 1, 1984, and U.S. Pat. No. 4,340,706 (Obayashi et al.) issued July 20, 1982. A modified bulk process is described in U.S. Pat. No. 4,703,067 (Mikita et al.) issued Oct. 27, 1987.

The Brandt et al. patent discloses a gel process comprising the steps of preparing a reaction mixture consisting essentially of particular amounts of unsaturated polymerizable acid group-containing monomers, crosslinking agent and optionally free radical initiator in an aqueous medium; subjecting this reaction mixture to polymerization conditions to produce a substantially water-insoluble, slightly crosslinked polymer material having under certain conditions particular gel volume, gel strength and extractable polymer content characteristics; and neutralizing at least a portion of the acid functional groups of the resulting polymer material with salt cations to form a partially neutralized polymer material having a degree of neutralization of at least 25%. The hydrogel material formed in accordance with the Brandt et al. patent may optionally be dried in order to prepare absorbent hydrogel-forming polymer materials which reform hydrogels upon subsequent contact with water or body fluids.

A typical inverse suspension process for producing superabsorbent polymers is disclosed in the Cramm et al. patent. This process provides for the suspending of an aqueous solution of acrylic acid and an alkali metal acrylate or ammonium acrylate, the mole ratio of the acrylic acid to the alkali metal acrylate or the ammonium acrylate being 50/50 to 2/98, in an alicyclic or aliphatic hydrocarbon solvent containing a surfactant having an HLB value of 8-12; subjecting the resulting suspension to inverse suspension polymerization in the presence of a water-soluble radical polymerization initiator and; if necessary, crosslinking the resulting polymer with a crosslinking agent, whereby the polymerization is conducted in the presence of a water-soluble chain transfer agent. The water-soluble chain transfer agent being formic acid.

Mikita et al. disclose a modified bulk process for producing superabsorbent polymers comprising the steps of combining potassium acrylate and a polyvinyl monomer with water in an amount of 55 to 80 combined weight percent of potassium acrylate and polyvinyl monomer based on the total weight of potassium acrylate, polyvinyl monomer and water to form a monomer mixture; and adding a polymerization initiator to the monomer mixture to initiate polymerization of the monomer mixture. The monomer mixture is polymerized without external heating by utilization of exothermic heat of reaction as substantially the only non-ambient energy source to drive water away from the polyacrylate resin to form the crosslinked polyacrylate resin having a water content sufficiently low, i.e., 15% or less, to be powdered, such as by pulverization, without an intermediate drying step.

Each of the aforementioned processes used to produce superabsorbent polymers may generate superabsorbent polymer fines. Superabsorbent polymer fines are defined as those particles which are too small in size for current market applications, e.g., diapers, sanitary napkins, etc. The fines may be generated either during the polymerization step of the process or during subsequent processing steps when the superabsorbent polymer is ground and sieved to meet desired particle size specifications.

As an example, in the production of superabsorbent polymer material for use as an absorbent in a certain personal product application all particles smaller than about +280 mesh are considered fines. Fines recovered from superabsorbent material used in this particular application may amount to between 5-35% of the total polymer produced.

Since superabsorbent fines are those particles which are too small in size for a specific market application, they are typically removed from a commercial product via a size classification step. The resulting fines are typically stored or disposed of until a suitable market can be found for them. Commercial applications of superabsorbent fines are limited by the small particle size which typically results in handling problems, such as, gel blocking and dusting.

Retaining fines in commercially used superabsorbent polymer material may also result in gel blocking, i.e., the fines block larger particles causing reduced absorbent capability of the total material. Due to gel blocking effects, fines are normally separated from the superabsorbent polymer material prior to commercial application.

Due to the high disposal, storage and handling costs associated with superabsorbent polymer fines, it is desirable to develop new methods for handling and utilizing these fines. One such process for recovering and reprocessing superabsorbent polymer fines is set forth in co-pending U.S. patent application, Ser. No. 286,115, filed on Dec. 16, 1988, now U.S. Pat. No. 4,950,692, and entitled "Method for Reconstituting Superabsorbent Polymer Fines", i.e., a method for reconstituting superabsorbent polymer fines which comprises the following steps: wetting the superabsorbent polymer fines sufficient to form an amorphous gel of the fines; grinding the gel; and drying the ground gel product The present invention is an improvement on the aforementioned three step process for reconstituting superabsorbent polymer fines, whereby the polymer fines are simultaneously chemically modified during the reconstitution process so as to provide additional crosslinking throughout the superabsorbent polymer and, consequently, greatly improve the gel strength of the resultant reconstituted superabsorbent polymer material.

The ability of "hot" initiators such as sodium persulfate to crosslink polymers is well known. For example, the use of peroxide initiators, such as sodium persulfate, to crosslink the surface of polymers is disclosed in European patent No. 0 248 437 (Saotome), which was published on Dec. 9, 1987.

The Saotome patent discloses a process for improving a water absorbent polyacrylic acid polymer in which the polymer is contacted with an aqueous solution containing a water soluble peroxide radical initiator, followed by heating, thereby causing substantially only the surface portion of the polymer to undergo crosslinking with the radical initiator while leaving the remaining core portion of the polymer substantially intact. The weight ratio of the water of the aqueous solution to the polymer being from 0.01 to 0.5, thereby causing the polymer substantially only at its surface portion to have the solution absorbed therein. Subsequent to the contacting of the surface of the polymer with the aqueous solution containing a water soluble peroxide radical initiator, the mixture is heated at a temperature such that said initiator is decomposed while the polymer is not decomposed causing the polymer at its surface portion to undergo crosslinking by the action of the initiator while leaving intact the remaining core portion of the polymer. The surface crosslinking of the Saotome patent is achieved by using high solids, i.e., 66.7–99%.

The present inventors have discovered that addition of a free radical initiator into the aqueous solution used in wetting polymer fines during the reconstitution of such polymer fines results in the formation of a reconstituted polymer material having higher gel strength. Contrary to the Saotome patent, the present invention necessitates that the initiator be distributed uniformly throughout the polymer, not just at the surface. That is, the present inventors have discovered that the use of a lower solids levels, e.g., 5–50%, not only assists in the reconstitution of the polymer fines, but also ensures the uniform distribution of the aqueous initiator solution throughout the fines. By distributing the persulfate solution throughout the polymer fines, more uniform crosslinking (both internal and surface) is possible. Thereafter, the drying step generates initiator radicals which result in increased crosslinking throughout the polymer fines, thereby forming a reconstituted polymer material having higher gel strength.

Thus, the present invention provides a unique process which overcomes the disposal and handling problems associated with superabsorbent polymer fines, while forming a reconstituted polymer material which demonstrates higher gel strength verses conventional reconstituted polymer material.

Additional advantages of the present invention shall become apparent as described below.

SUMMARY OF THE INVENTION

It is the primary object of the present invention to provide a method for reconstituting superabsorbent polymer fines which comprises the following steps: wetting the superabsorbent polymer fines with an aqueous solution sufficient to form an amorphous gel of the fines, grinding the gel, and drying the ground gel product; wherein the improvement is characterized by the addition of an aqueous solution containing a free radical initiator capable of forming a superabsorbent polymer material having higher gel strength: Such a superabsorbent polymer material being particularly suitable for commercial use as an absorbent in applications, such as, diapers, sanitary napkins, dish clothes, soil additives, fuel filters, coagulation of sludges, prevention of condensation (desiccants), and dehydration of oils.

The preferred free radical initiator is a persulfate salt selected from the group consisting of potassium persulfate, ammonium persulfate, and sodium persulfate. It is also an object of the present invention that the gel of polymer fines comprises 5–50% polymer, 50–95% water, and about 100–5000 ppm persulfate salt based on the polymer. It is more preferable that the gel of polymer fines comprises 30–40% polymer, 60–70% water, and about 250–1000 ppm persulfate salt based on the polymer.

The present invention may also include many additional features which shall be further described below.

DESCRIPTION OF THE EMBODIMENTS

Superabsorbent polymers, such as synthetic superabsorbent polymers, starch graft superabsorbent polymers and crosslinked polyacrylate superabsorbent polymers may be used in applications, such as, diapers, sanitary napkins, soil additives, fuel filters, desiccants, cements, and sludge dewatering. During commercial production or use of such polymers a quantity of undesirably small particles called fines may be generated. Such fines may be generated during the polymerization step of the process, during subsequent processing steps when the superabsorbent polymer is ground and/or classified to meet desired particle size specifications, or as a result of attrition during commercial production or use.

The present invention provides a novel method for simultaneous chemical modification and reconstitution of superabsorbent polymer fines. Any superabsorbent polymer fines may be reprocessed in accordance with this invention, although it is particularly suitable for starch graft superabsorbent polymers, synthetic superabsorbent polymers, and crosslinked superabsorbent polymers.

Superabsorbent polymer fines are generally substantially water-insoluble, slightly crosslinked, partially neutralized, hydrogel-forming, polymer material. One such crosslinked polymer is a crosslinked polyacrylate superabsorbent polymer. Polyacrylate superabsorbent polymers may be formed by polymerizing acrylic acid and/or alkali metal salts of acrylic acid alone or in combination With other monomers and/or crosslinkers which are known to be useful in the preparation of water absorbent polymers. Examples of these monomers include, but are not limited to, nonionic monomers like acrylamide, methyl methacrylate and N-vinyl pyrrolidone, sulfonated monomers like sodium acrylamidomethane sulfonate and sodium styrene sulfonate, and cationic monomers such as diallyldimethyl ammonium chloride and dimethylaminoethyl methacrylate-methyl chloride quaternary.

Other crosslinked superabsorbent polymers and methods for producing are set forth in U.S. Pat. Nos. 4,654,039, 4,286,082, 4,698,404, 4,446,261, and 4,703,067, all of which are incorporated herein by reference.

The present invention provides a method for reconstituting superabsorbent polymer fines which comprises the following steps: wetting the superabsorbent polymer fines with an aqueous solution sufficient to form an amorphous gel of the fines, grinding the gel, and drying the ground gel product; wherein the improvement is characterized by the addition of an aqueous solution containing a free radical initiator capable of forming a superabsorbent polymer material having higher gel strength.

Optionally, the drying step may be followed by additional steps of dry grinding and size classification or separation to obtain particles of desired size.

The superabsorbent polymer fines are wetted or rewetted to a swollen state for the purpose of forming a continuous amorphous gel mass having no discrete particles. Preferably, the wetting of the fines should occur under agitating conditions sufficient to disperse the liquid or other wetting agent throughout the fines to provide a uniform amorphous or homogeneous gel.

The fines are wetted with an aqueous solution containing a free radical initiator capable of forming a reconstituted superabsorbent polymer material having higher gel strength. The fines are typically wetted to between about 5–50% solids, preferably 20–50% solids, and more preferably 30–40% solids.

The free radical initiator in the aqueous solution is typically a persulfate salt selected from the group consisting of potassium persulfate, ammonium persulfate, and sodium persulfate. The gel of polymer fines comprises 5–50% polymer, 50–95% water, and about 100–5000 ppm persulfate salt based on the polymer (BOP). It is more preferable that the gel of polymer fines comprises 30–40% polymer, 60–70% water, and about 250–1000 ppm persulfate salt based on the polymer.

The aqueous solution is formed by either (1) dissolving the free radical initiator in water, or (2) mixing an aqueous solution of the free radical initiator and water. That is, the addition of the persulfate salt to the superabsorbent polymer fines can be accomplished in either of two ways.

In the first method, a dilute solution of the persulfate salt is prepared such that mixing of the polymer fines with the dilute persulfate solution results in a gel which contains the desired solids level and concentration of persulfate. The concentration of this dilute persulfate solution depends entirely on the solids level and level of persulfate salt desired. For example, the solids level or percent superabsorbent polymer fines in the gel can easily vary from 5–50%, preferably 20–50%, and more preferably 30–40%. The persulfate salt level can easily vary from about 100–5000 ppm (based on polymer) or possibly even higher. Table 1 below sets forth appropriate persulfate salt concentrations in the make-up water in relation to the range of solids level in the gel.

TABLE I

| PERSULFATE SALT CONCENTRATIONS | |
|---|---|
| SOLIDS LEVEL | PERSULFATE SALT CONCENTRATION* |
| 5–50% | 5 ppm to 5000 ppm |
| 20–50 | 25 to 5000 ppm |
| 30–40 | 40 to 3340 ppm |

*Concentration of persulfate salt in water

A second method for dosing the persulfate salt involves the preparation of a standard solution of persulfate in water. The concentration of this solution would remain constant (e.g., 1.0%). This solution is then diluted inline with the appropriate quantity of water in order to obtain the desired solids level and persulfate concentration.

The amorphous gel formed by wetting and swelling the fines under agitating conditions is thereafter ground by any conventional wet grinding device. The wet grinder minces or chops the amorphous gel to a particle size satisfactory for both the drying step and future processing requirements. It is also envisioned that the minced amorphous gel may be diverted directly for combination with gel from an on-going gel polymerization process.

The fines and aqueous solution are preferably mixed to assure that all solids have been rewet sufficient to form a continuous amorphous gel. Mixing can be either by batch or continuous mixers. The mixing time required to obtain such a gel is dependent on the type of mixing device used.

The drying step takes place in either a belt dryer, tray dryer, fluid bed dryer, or any other means known to those skilled in the art. The gel is dried sufficient to facilitate dry grinding thereof into a superabsorbent polymer material. That is, the gel should be dried sufficient to form a superabsorbent polymer material with a moisture content in the range between about 1–15%, preferably between about 1–4%. The gel is preferably dried at a temperature between about 120°–150° C., whereby the drying process step generates initiator radicals which result in increased crosslinking throughout the polymer material, thereby forming a superabsorbent polymer material with higher gel strength.

After the drying step, the superabsorbent polymer material can optionally be dry ground. Useful types of grinders include, but are not limited to, hammer mills, pin mills, ball mills and roller mills, such as, a twin roll grinder. The particles can be ground to any desired size depending on their pending application. Size separation of the superabsorbent polymer material reconstituted in accordance with this process permits the recycling of fines and oversized particles for additional reprocessing.

The reconstituted superabsorbent polymer material formed in accordance with this invention can be used either alone or mixed with conventional polymer Particles in commercial applications.

The method according to the present invention can be better understood from the following example.

EXAMPLE 1

Various samples of reconstituted superabsorbent polymer material, either modified with sodium persulfate (SPS) or unmodified, were tested to determine their capacity in grams of 0.9% saline per gram of polymer after the reconstituted superabsorbent polymer materials were allowed to swell for periods of 10 minutes and 60 minutes. The shear modulus (dynes/cm$^2$) of each sample was determined using a Rank Pulse Shearometer. Shear modulus is a measure of gel strength.

Five (5) samples were tested. Sample 1 is a commercially available polyacrylate superabsorbent polymer fine. Samples 2-5 are reconstituted superabsorbent polymer fines prepared from mixtures of the superabsorbent polymer fines of sample 1 with aqueous solutions containing varying amounts of sodium persulfate salts. The constituent weight percents of each sample 2-5 are set forth below in Table 2.

TABLE 2

| MODIFIED SUPERABSORBENT POLYMER FINES | | | | |
|---|---|---|---|---|
| SAMPLE | WEIGHT % POLYMER[1] | WEIGHT % WATER | WEIGHT % SPS | PPM SPS (BOP)[2] |
| 2 | 35.0 | 65.0 | 0.0 | 0 |
| 3 | 35.0 | 64.9912 | 0.0088 | 250 |
| 4 | 35.0 | 64.9825 | 0.0175 | 500 |
| 5 | 35.0 | 64.9650 | 0.035 | 1000 |

POLYMER[1] = commercially available polyacrylate superabsorbent polymer fines
BOP[2] = based on polymer Since the amount of sodium persulfate (SPS) used in these lab scale experiments was so small, a 1.0% aqueous solution of sodium persulfate (SPS) was prepared and added to the appropriate quantity of water. The superabsorbent polymer fines were then added and mixed to form a gel. The quantities of fines, 1% SPS, and water used in this example are shown in Table 3 below.

TABLE 3

| SAMPLE | WEIGHT % POLYMER | WEIGHT % 1.0% SPS/H$_2$O | WEIGHT % WATER |
|---|---|---|---|
| 2 | 35.0 | 0.0 | 65.0 |
| 3 | 35.0 | 0.875 | 64.125 |
| 4 | 35.0 | 1.75 | 63.25 |
| 5 | 35.0 | 3.5 | 61.50 |

The gel was dried at 120° C. for 2 hours and ground. The results of the capacity and shear modulus tests are set forth below in Table 4.

TABLE 4

| SAMPLE | SPS (PPM BOP) | CAPACITY (G/G) 10 MIN | CAPACITY (G/G) 60 MIN | SHEAR MODULUS (DYNES/CM$^2$) |
|---|---|---|---|---|
| 1 |  | 35.5 | 35.9 | 38470 |
| 2 | 0 | 30.2 | 33.3 | 47480 |
| 3 | 250 | 29.3 | 30.9 | 52800 |
| 4 | 500 | 28.3 | 30.2 | 55030 |
| 5 | 1000 | 28.4 | 29.0 | 62530 |

Based upon the aforementioned results it is quite apparent that the modification of reconstituted superabsorbent polymer fines with a persulfate salt, such as sodium persulfate, provides a more highly crosslinked superabsorbent polymer material which has higher gel strength versus conventional reconstituted polymer material.

While we have shown and described several embodiments in accordance with our invention, it is to be clearly understood that the same are susceptible to numerous changes and modifications apparent to one skilled in the art. Therefore, we do not wish to be limited to the details shown and described but intend to show all changes and modifications which come within the scope of the appended claims.

What is claimed is:

1. A method for reconstituting superabsorbent polymer fines comprising the following steps: wetting said superabsorbent polymer fines with an aqueous solution sufficient to form a gel of said fines, grinding said gel, and drying the ground gel to form a superabsorbent polymer material; wherein the improvement is characterized by said aqueous solution containing a persulfate salt such that the gel of said polymer fines comprises about 5-50% polymer, about 50-95% water, and about 100-5000 ppm persulfate salt based on said polymer.

2. The method according to claim 1, wherein said persulfate salt is selected from the group consisting of potassium persulfate, ammonium persulfate, and sodium persulfate.

3. The method according to claim 1, wherein the gel of said polymer fines comprises about 20-50% polymer, about 50-80% water, and about 100-5000 ppm persulfate salt based on said polymer.

4. The method according to claim 3, wherein said persulfate salt is present in said aqueous solution in an amount in the range between about 25 ppm to about 5000 ppm.

5. The method according to claim 3, wherein the gel of said polymer fines comprises about 30-40% polymer, about 60-70% water, and about 100-5000 ppm persulfate salt based on said polymer.

6. The method according to claim 4, wherein said persulfate salt is present in said aqueous solution in an amount in the range between about 40 ppm to about 3340 ppm.

7. The method according to claim 1, wherein said persulfate salt is present in an amount in the range between about 250 to about 1000 ppm based on said polymer.

8. The method according to claim 1, wherein said persulfate salt is present in said aqueous solution in an amount in the range between about 5 ppm to about 5000 ppm.

9. The method according to claim 1, wherein said aqueous solution is formed by mixing a solution of said persulfate salt and water.

10. The method according to claim 1, wherein said aqueous solution is formed by dissolving said persulfate salt in water.

11. The method according to claim 1, wherein the step of drying is followed by grinding said superabsorbent polymer material.

12. The method according to claim 11, wherein the step of grinding said superabsorbent polymer material is followed by size classification of the ground superabsorbent polymer material, whereby particles of desired size are captured.

13. The method according to claim 1, wherein said step takes place under agitating conditions.

14. The method according to claim 1, wherein said gel is dried sufficient to form a superabsorbent polymer material with a moisture content in the range between about 1-15%.

15. The method according to claim 14, wherein said gel is preferably dried sufficient to form a superabsorbent polymer material with a moisture content in the range between about 1-4%.

16. The method according to claim 1, wherein said superabsorbent polymer fines are at least one material selected from the group consisting of starch graft superabsorbent polymers, synthetic superabsorbent polymers, and crosslinked superabsorbent polymers.

17. The method according to claim 16, wherein said crosslinked superabsorbent polymers are substantially water-insoluble, slightly crosslinked, partially neutralized, hydrogel-forming, polymer materials.

18. The method according to claim 17, wherein a crosslinked superabsorbent polymer is a crosslinked polyacrylate superabsorbent polymer.

19. The method according to claim 1, wherein said gel is dried at a temperature in the range between about 120°–150° C.

* * * * *